(12) United States Patent
Xiong et al.

(10) Patent No.: US 9,977,282 B2
(45) Date of Patent: May 22, 2018

(54) LIQUID CRYSTAL SCREEN AND LIQUID CRYSTAL DISPLAY

(71) Applicant: Wuhan China Star Optoelectronics Technology Co., Ltd., Wuhan, Hubei (CN)

(72) Inventors: Bin Xiong, Guangdong (CN); Zhongjie Liu, Guangdong (CN); Qian Chen, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 124 days.

(21) Appl. No.: 15/143,623

(22) Filed: May 1, 2016

(65) Prior Publication Data

US 2017/0212382 A1  Jul. 27, 2017

(30) Foreign Application Priority Data

Jan. 26, 2016  (CN) .......................... 2016 1 0051183

(51) Int. Cl.
  *G02F 1/1335* (2006.01)
  *G02F 1/1368* (2006.01)
  *G02F 1/1333* (2006.01)

(52) U.S. Cl.
  CPC ...... *G02F 1/133528* (2013.01); *G02F 1/1368* (2013.01); *G02F 1/133514* (2013.01); *G02F 2001/133302* (2013.01); *G02F 2202/28* (2013.01)

(58) Field of Classification Search
  CPC ..................... G02F 1/133528; G02F 2202/28
  See application file for complete search history.

(56) References Cited

U.S. PATENT DOCUMENTS

| | | | | |
|---|---|---|---|---|
| 8,797,473 B2* | 8/2014 | Takabayashi | ....... | G02F 1/13452 349/58 |
| 2007/0291216 A1* | 12/2007 | Chan | ..................... | G02F 1/1339 349/153 |
| 2013/0027857 A1* | 1/2013 | Jeong | ................ | G02F 1/133308 361/679.01 |
| 2016/0154271 A1* | 6/2016 | Kim | .................. | G02F 1/133308 349/58 |

* cited by examiner

*Primary Examiner* — Kendrick Hsu
(74) *Attorney, Agent, or Firm* — Andrew C. Cheng

(57) ABSTRACT

A liquid crystal screen includes an upper polarization sheet, an upper glass plate, a lower glass plate, and a lower polarization sheet that are stacked sequentially. The upper polarization sheet and the lower polarization sheet are bonded to each other by adhesive to form a box having an open end. The upper glass plate and the lower glass plate are received in the box. Side faces of the upper glass plate and the lower glass plate are covered by the adhesive. The upper glass plate and the lower glass plate project out of the upper polarization sheet and the lower polarization sheet from an edge thereof. Areas between the upper and lower glass plates and the edge of the upper and slower polarization sheets are bonded by the adhesive. A liquid crystal display is also provided.

6 Claims, 3 Drawing Sheets

LIQUID CRYSTAL SCREEN AND LIQUID CRYSTAL DISPLAY

BACKGROUND OF THE INVENTION

1. Field of the Invention

The present invention relates to electronic display equipment, and more particularly to a liquid crystal screen and a liquid crystal display.

2. The Related Arts

As shown in FIGS. 1 and 2, a conventional liquid crystal screen 1 is formed by sequentially stacking an upper polarization sheet 101, a color filter (CF) glass plate 102, a thin-film transistor (TFT) glass plate 103, and a lower polarization sheet 104. In the prior art, the upper and lower polarization sheets 101 are retracted inward with respect to the CF glass plate 102 and the TFT glass plate 103. In the manufacture of a liquid crystal display (LCD), a large piece of glass plate needs to be cut into small pieces of glass and during such a process, edges of the glass plate(s) may generate minute cracking as illustrated in FIGS. 3 and 4. Such minute cracking, if not properly protected, would become large cracking, affecting a normal operation of the LCD. Referring to FIGS. 1 and 2, since the upper and lower polarization sheets 101, 104 are retracted inward with respect to the CF glass plate 102 and the TFT glass plate 103, the cracking in the edges of the CF glass plate 102 and the TFT glass plate 103 is not subjected to any protection and may, subsequently become large cracking. Further, due to cutting tolerance or clearance of the upper and lower polarization sheets, and lamination tolerances occurring in laminating the upper and lower polarization sheets with an automatic machine, undesired location shifting of the upper and lower polarization sheets may occur.

SUMMARY OF THE INVENTION

The present invention provides a liquid crystal screen, which comprises an upper polarization sheet, an upper glass plate, a lower glass plate, and a lower polarization sheet that are stacked in sequence. The upper polarization sheet and the lower polarization sheet are bonded to each other by adhesive to form a box having an open end. The adhesive is applied to edges of the upper polarization sheet and the lower polarization sheet. The upper glass plate and the lower glass plate are received in the box. The upper glass plate and the lower glass plate have side faces that are covered by the adhesive. The upper glass plate and the lower glass plate project out of the upper polarization sheet and the lower polarization sheet from an edge thereof. Contact areas between the upper glass plate and the lower glass plate and the edge of the upper polarization sheet and the lower polarization sheet are boded with the adhesive.

In the above liquid crystal screen, the upper polarization sheet and the lower polarization sheet are provided with a recess, and the adhesive is disposed in the recess.

In the above liquid crystal screen, a contact surface between the upper polarization sheet and the lower polarization sheet and the adhesive is a curved surface or a slope.

In the above liquid crystal screen, the upper glass plate is a CF glass plate.

In the above liquid crystal screen, the lower glass plate is a TFT glass plate.

The present invention also provides a liquid crystal display, which comprises a liquid crystal screen as described above.

Compared to the prior art, the present invention allows a CF glass plate and a TFT glass plate to be accommodated in a box formed of an upper and a lower polarization sheets bonded with adhesive, cracking in edges of the CF glass plate and the TFT glass plate can be wrapped by the adhesive so as to have the cracking in the edges of the CF glass plate and the TFT glass plate protected.

BRIEF DESCRIPTION OF THE DRAWINGS

To more clearly explain the technical solution proposed in an embodiment of the present invention and that of the prior art, a brief description of the drawings that are necessary for describing embodiments is given as follows. It is obvious that the drawings that will be described below show only some embodiments. For those having ordinary skills of the art, other drawings may also be readily available from these attached drawings without the expense of creative effort and endeavor.

DETAILED DESCRIPTION OF THE PREFERRED EMBODIMENTS

A clear and complete description will be given to a technical solution of embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Figure 1:
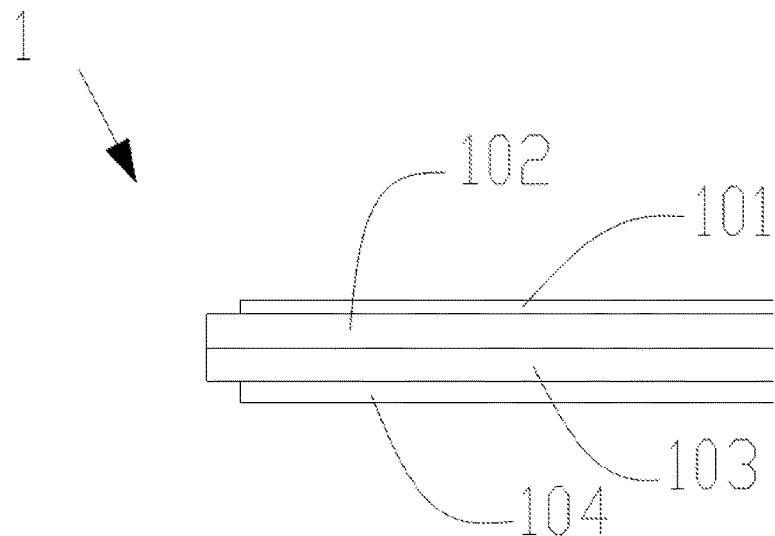
FIG. 1 is a schematic view illustrating a front side structure of a conventional liquid crystal screen.
Figure 2:
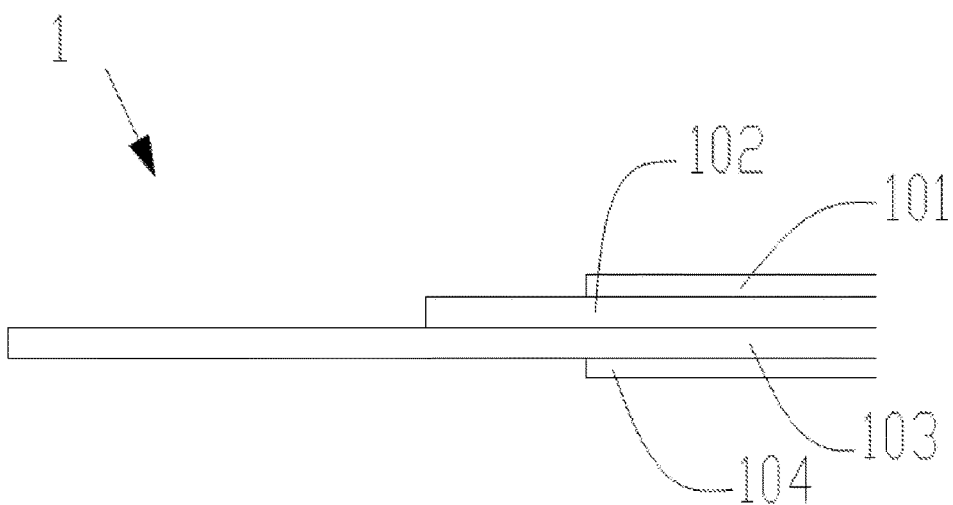
FIG. 2 is a schematic view illustrating a lateral side structure of the conventional liquid crystal screen.
Figure 3:
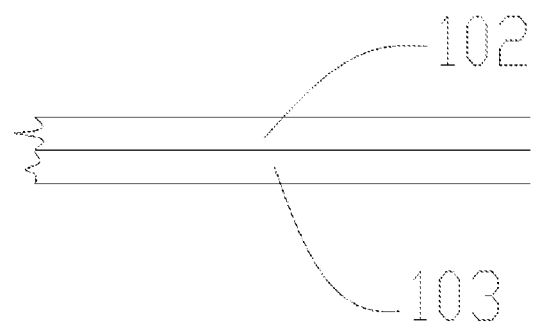
FIG. 3 is a front view, in an enlarged form, illustrating a color filter (CF) glass plate and a thin-film transistor (TFT) glass plate stacked on each other according to the prior art.
Figure 4:
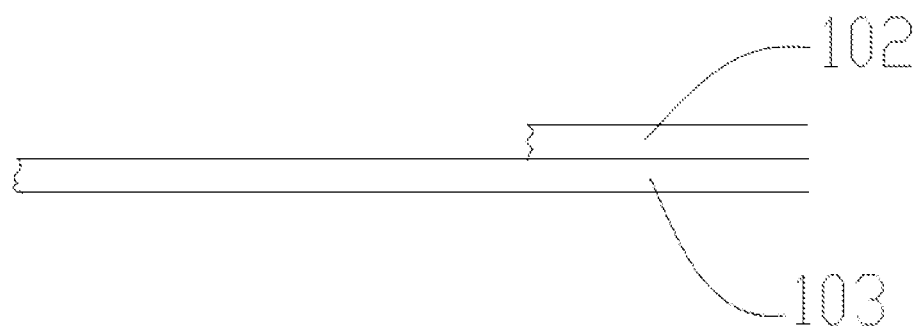
FIG. 4 is a side elevational view, in an enlarged form, illustrating the CF glass plate and the TFT glass plate stacked on each other according to the prior art.
Figure 5:
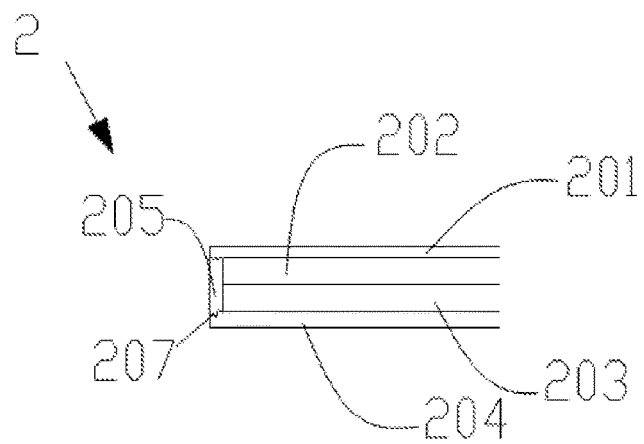
FIG. 5 is a schematic view illustrating a front side structure of a liquid crystal screen according to the present invention.
Figure 6:
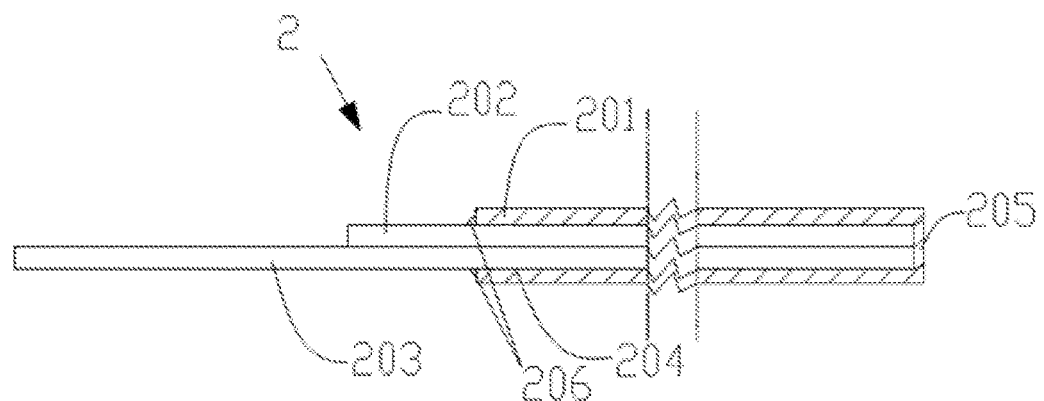
FIG. 6 is a schematic view illustrating a lateral side structure of the liquid crystal screen according to the present invention.

Referring to FIG. 5, a liquid crystal screen 2 comprises an upper polarization sheet 201, a color filter (CF) glass plate 202, a thin-film transistor (TFT) glass plate 203, and a lower polarization sheet 204 that are stacked in sequence. Since the liquid crystal screen 2 is structured such that left and right ends are symmetric, FIG. 5 illustrates only one end of the liquid crystal screen 2. Referring to FIGS. 5 and 6, three edges of the upper polarization sheet 201 and the lower polarization sheet 204 are bonded together by means of adhesive 205 so that the upper polarization sheet 201 and the lower polarization sheet 204 collectively form a box having an open end. The adhesive 205 is applied to edges of the upper polarization sheet 201 and the lower polarization sheet 204. The CF glass plate 202 and the TFT glass plate 203, after stacked, are received in the box formed of the upper polarization sheet 201 and the lower polarization sheet 204 and the adhesive 205 that is adhesively attached to the box would adhesively bond and enclose around edges of the CF glass plate 202 and the TFT glass plate 203. The adhesive 205 used here can, on the one hand, fix the CF glass plate 202 and the TFT glass plate 203 in position, and on the other hand, minute cracking generated in the edges of the CF glass plate 202 and the TFT glass plate 203 during the manufacture thereof can be protected by the adhesive so as to prevent large cracking from occurring subsequently.

Referring to FIG. 6, the CF glass plate 202 and the TFT glass plate 203 project out of the box from the open end thereof and contact regions between the CF glass plate 202 and the TFT glass plate 203 and sides of the opening are covered by the adhesive 206. The portion of the adhesive 206 in these regions function to fix the CF glass plate 202 and the TFT glass plate 203. It can be understood that glass plates other than the CF glass plate and the TFT glass plate may also be involved in the liquid crystal screen and stacking may also be achieved with other arrangements.

It is noted, as shown in FIG. 5, the upper polarization sheet 201 and the lower polarization sheet 204 may be provided with a recess 207, and the adhesive can be applied, or partly received, in the recess 207. The recess 207 functions to increase a contact area between the adhesive and the upper polarization sheet 201 and the lower polarization sheet 204 in order to more effectively fix each sheet and plate. Further, the upper polarization sheet 201 and the lower polarization sheet 204 are provided with slopes (not shown) for engaging the adhesive and such slopes form an angle with respect to a lower surface of the upper polarization sheet 201 or an upper surface of the lower polarization sheet 204. The slopes similarly increase the contact areas between the adhesive and the upper polarization sheet 201 and the lower polarization sheet 204 for better fix the sheets and plates. It is understood that the contact surfaces between the upper polarization sheet 201 and the lower polarization sheet 204 and the adhesive can be of other shapes, such as a curved surface.

Referring to FIGS. 5 and 6, except the open end, the remaining three side edges of the upper polarization sheet 201 and the lower polarization sheet 204 are arranged to extend outside and project beyond corresponding edges of the CF glass plate 202 and the TFT glass plate 203. Thus, when an automatic machine is operated to laminate the upper polarization sheet 201 and the lower polarization sheet 204, the upper polarization sheet 201 and the lower polarization sheet 204 can be attached to completely cover the surfaces of the CF glass plate 202 and the TFT glass plate 203 without causing any tolerance or clearance issue resulting from inward retraction, whereby the accuracy of attaching the upper polarization sheet 201 and the lower polarization sheet 204 can be enhanced.

The present invention has been described with reference to the preferred embodiments. However, it is noted that those skilled in the art would appreciates that various improvements and modifications are still available without departing from the scope of the present invention and such improvements and modifications are considered within the scope of protection of the present invention.

What is claimed is:

1. A liquid crystal screen, comprising an upper polarization sheet, an upper glass plate, a lower glass plate, and a lower polarization sheet that are stacked in sequence, wherein the upper polarization sheet and the lower polarization sheet are bonded to each other by adhesive to form a box having an open end, the adhesive being applied to edges of the upper polarization sheet and the lower polarization sheet, the upper glass plate and the lower glass plate being received in the box, the upper glass plate and the lower glass plate having side faces that are covered by the adhesive, the upper glass plate and the lower glass plate projecting out of the upper polarization sheet and the lower polarization sheet from an edge thereof, contact areas between the upper glass plate and the lower glass plate and the edge of the upper polarization sheet and the lower polarization sheet being bonded with the adhesive;

wherein the edges of the upper polarization sheet and the lower polarization sheet have inner surfaces facing and opposite to each other and the adhesive is arranged between and in direct contact with the inner surfaces of the edges of the upper polarization sheet and the lower polarization sheet such that the adhesive is located completely between the upper polarization sheet and the lower polarization sheet to form the box having an open end.

2. The liquid crystal screen as claimed in claim 1, wherein the upper polarization sheet and the lower polarization sheet are provided with a recess, the adhesive being disposed in the recess.

3. The liquid crystal screen as claimed in claim 2, wherein a contact surface between the upper polarization sheet and the adhesive and a contact surface between the lower polarization sheet and the adhesive are each a curved surface or a slope.

4. The liquid crystal screen as claimed in claim 3, wherein the upper glass plate is a color (CF) glass plate.

5. The liquid crystal screen as claimed in claim 4, wherein the lower glass plate is a thin-film transistor (TFT) glass plate.

6. A liquid crystal display, comprising a liquid crystal screen according to claim 1.

\* \* \* \* \*